Oct. 8, 1929.  W. L. WRIGHT  1,730,712
OPTICAL SYSTEM
Filed Oct. 20, 1926
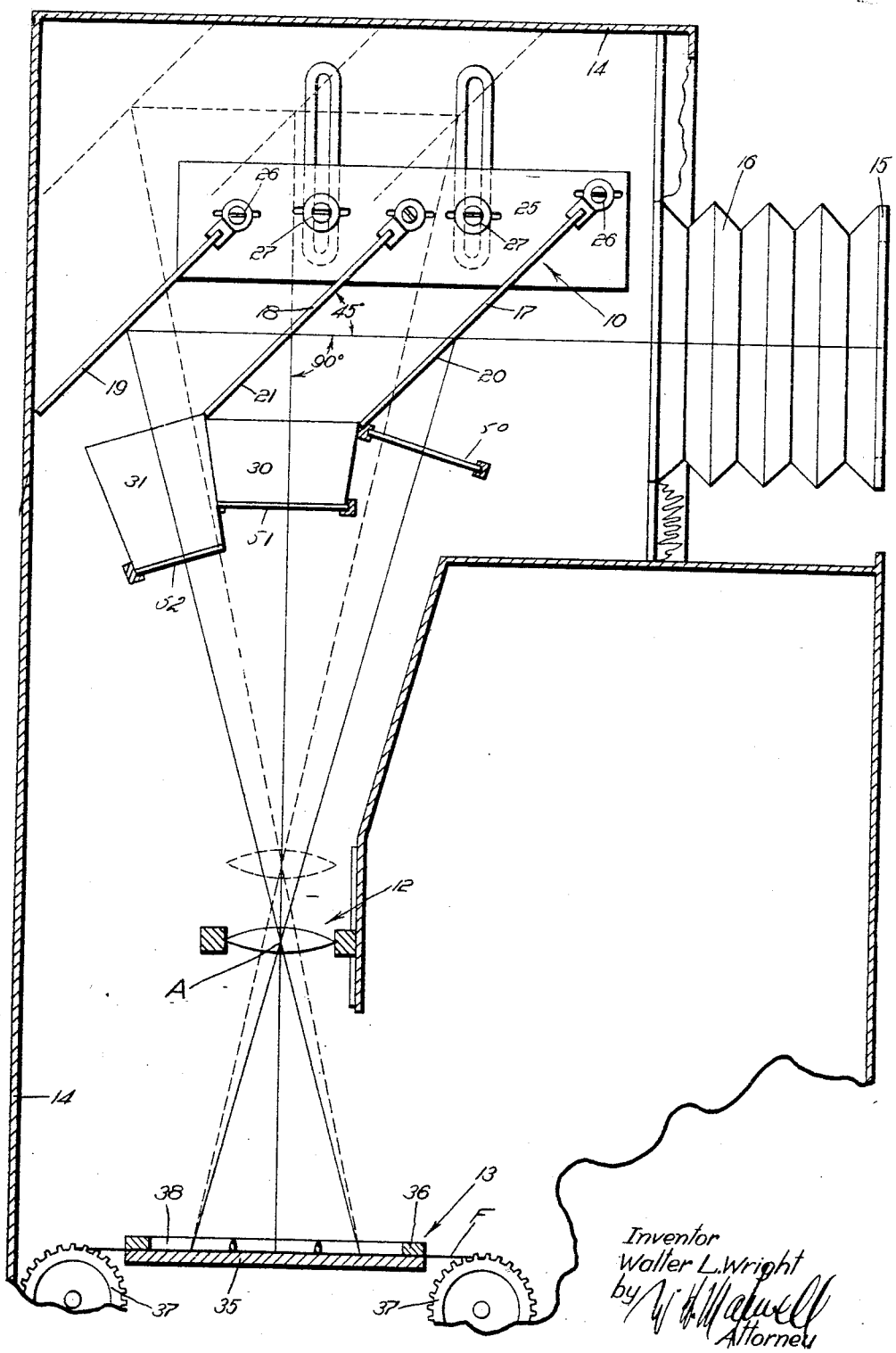
Inventor
Walter L. Wright
by [signature]
Attorney Patented Oct. 8, 1929

1,730,712

UNITED STATES PATENT OFFICE

WALTER L. WRIGHT, OF SANTA MONICA, CALIFORNIA

OPTICAL SYSTEM

Application filed October 20, 1926. Serial No. 142,848.

This invention has to do with an optical system and it is an object of the invention to provide an optical system whereby a plurality of like images can be obtained simultaneously in spaced relation adjoining each other on a single film.

In the production of color motion pictures, it is desirable to obtain simultaneously a plurality, for instance three, images of a subject of like-size, of different color values of the subject from a single angle and adjoining each other on a film. Further, for practical motion picture work it is necessary to use fast lenses in order to obtain the proper exposures in rapid succession which lenses are necessarily of large diameter. Further, in practice, it has been found impractical to accomplish the desired results with optical systems which interpose light dividing means, or the like, between the lens and the film. This is primarily because lenses which have been found practical for the taking of motion pictures do not allow sufficient distance between the lenses and films to accommodate the necessary light dividing apparatus.

It is a primary object of my present invention to provide an optical system for taking simultaneously, a plurality of like pictures of a subject adjoining each other on the film with a single lens device capable of taking practical motion pictures.

It is another object of this invention to provide an optical system of the character mentioned in which the light dividing means is ahead of the lens device.

The various objects and features of this invention will be best and more fully understood from the following detailed description of a typical form and application of the invention throughout which description I will refer to the accompanying drawings, in which:

The figure is a more or less diagrammatic view illustrating the optical system provided by this invention in a form in which it may be embodied in a motion picture camera.

The optical system provided by this invention includes generally, light dividing means 10, operable to divide a single shaft of light from a subject into a plurality of like-spaced shafts of light, and a single lens device 12, arranged to pass the spaced shafts of light from the light dividing means 10, and direct them onto a film F, to expose picture areas of the film. In the particular application of the invention shown in the drawings, the various parts are arranged within a suitable casing 14, which casing is provided with an adjustable aperture or mat plate 15 for admitting light into the optical system. A suitable bellows 16 may be provided in connection with the mat plate 15 as shown in the drawings to form a shield to eliminate as far as possible, stray or diffused light entering the case. The mat plate operates to shapen and adjust the size of the pictures.

The light dividing means 10 includes, generally, a first light divider 17, diagonally or angularly disposed in the path of the shaft of light passing through the mat plate 15, a second light divider 18 arranged in spaced relation behind the first light divider and in the path of the shaft of light passing through the mat plate 15, and a reflector 19, arranged in spaced relation behind the second light divider and at an angle in the path of light passing the mat plate 15. In the drawings I have disclosed the first light divider 17 in the form of a transparent plate having a front reflective surface 20 operable to reflect off part of the light falling on it. The plate forming the light divider 17 being transparent passes the light that is not reflected off by its front reflective face 20. The light passing through the light dividing plate 17 continues in the direction of the original shaft entering the system through the net plate 15, and falls upon the second light divider 18 which may be of the same nature as the first light divider, for instance, it may be in the form of a transparent plate having a front reflective surface 21 operable to reflect off part of the light falling on it. The light which passes through the second light dividing plate 18 continues in the direction of the original shaft of light entering the system through the mat plate 15 until it falls upon the reflector 19. The reflector 19 is preferably a front surface reflector. In accordance with my present invention the front reflective surfaces 20 and 21 and the reflector 19 are disposed at different angles in the path of the light entering through the mat plate 15 so that the shafts of light reflected off by them converge so that their axes intersect at a single point A. In practice the surfaces 20 and 21 and 19 are spaced far enough apart, one behind the other, so that the shafts of light reflected off by them are not interfered with, yet at the same time it is desirable that the reflective surfaces be as close together as possible. In the particular arrangement illustrated in the drawings, the reflective surface 21 of the second light divider is disposed at an angle of 45° to the axis of the shaft of light falling on it so that the shaft of light reflected off by it is at an angle of 90° to the shaft of light falling on it. The reflective surface 20 of the first light divider is arranged in the path of the shaft of light falling on it at an angle somewhat less than 45° so that the shaft of light reflected off forms an angle somewhat greater than 90° with the shaft of light falling on it.

The reflector 19 is disposed in the path of the shaft of light falling on it at an angle somewhat less than 45° so that the shaft of light reflected off by it is at an angle somewhat less than 90° with the shaft of light falling on it. The shaft of light reflected by the surface 20 is the same amount more than an angle of 90° with the original shaft as the angle of the shaft of light reflected from the reflector 19, is less than an angle of 90° with the original shaft, thus causing the two reflected shafts to intersect the shaft reflected by the reflector 21 at a common point A. In construction, the parts of the light dividing means may be mounted in different manners as the system may require. I have shown the dividers 17 and 18 and the reflector 19 adjustably mounted on a carriage 25 which in turn is adjustably mounted in the casing 14. I have shown the dividers and reflector mounted through screw members 26 so that they can be placed in different angular positions and can be shifted bodily in a direction longitudinal of the shaft of light entering through the mat plate 15. I have shown the carrier 25 mounted through screw members 27 so that it can be adjusted in a direction at right angles to the shaft of light entering through the mat plate 15. In practice I may provide compensating means in the light dividing apparatus to compensate for the slight difference in size between the several shafts of light caused by the difference in distance the several shafts of light travel in reaching the point A. For this purpose, I may provide bodies or blocks 30 and 31 of transparent material in the paths of the shaft of light from the surface 21 and reflector 19 respectively, which material is such as to refract the light enough to compensate for the variation in size of the shafts above mentioned. The bodies of transparent material 30 and 31 are of course formed with optically flat, truly parallel front and rear surfaces disposed in planes at right angles to the shafts of light so that the shafts are not distorted out of line but simply corrected in size due to the refractive quality of the material employed in the bodies. It is necessary to cause more correction in the shaft of light reflected by the reflector 19 than in the shaft reflected by the surface 21 so, therefore, I make the body 31 in the path of the light reflected by the reflector 19 thicker than the body 30 in the path of the shaft reflected by the surface 21. If lens is such as to cause distortion of the end images this may be neutralized or remedied by slightly tilting the planes of the end film areas.

The lens device 12 which I have illustrated more or less diagrammatically in the drawings is interposed between the light dividing means and film. In a simple application of the invention as shown in the drawings, the light passes directly from the light dividing means 10 through the lens device 12 onto the film F. For practical reasons which will be obvious to these familiar in the art, it is desirable that this film F be spaced a substantial distance from the light dividing means and in practice, in order to obtain sufficient distance within a compact space, the shafts of light directed off by the light dividing means may be further reflected or directed in passing from the light dividing means to the film. In the drawings I have shown a direct passage from the means 10 to the film in order to simplify an understanding of the fundamental principles of the invention. With the optical system provided by this invention, the lens device 12 may be a standard lens of the type used in practical production of motion pictures, for instance, it may be a fast or wide-aperture lens having a focal length suitable for motion picture work. If lens is such as to cause distortion of the end images this may be neutralized or remedied by slightly tilting the planes of the end film areas. The shafts of light after passing through the lens device 12 fall upon the film F to expose adjoining picture areas of the film. The film may be handled in suitable means 13 comprising a backing plate 35, an aperture plate 36 and film moving sprockets 37. In the particular case illustrated in the drawings it is desirable to expose adjoining picture areas on the film F so therefore the aperture plate 36 is provided with three apertures 38 which immediately adjoin each other to be divided only by lines of division such as are desirable in commercial motion picture film. To adjust the distance between the lens device and film and at the same time maintain the shafts of light falling on the film, of a constant size and in a constant spaced relation, it is necessary to move the lens device with reference to the film. This necessitates shifting or adjustment of the light dividers and reflector with reference to the lens device and requires shifting of the position of the mat plate 15. For purpose of example I have indicated in dotted lines, a different setting or position of the parts in which case, the lens device is shown spaced farther away from the film, than in the case shown in full lines, and the light dividing means is shown spaced farther away from the lens device than in the case shown in full lines. In practice my optical system is useful primarily for the production of color pictures, so therefore it is desirable to provide means in combination with the optical system whereby the several shafts of light falling upon the film F are different chromatically. This differentiation may be accomplished in numerous ways that will readily suggest themselves to those familiar in the art. For purpose of example I may refer to a violet filter 50 in the path of the light reflected by the first light divider, an orange filter 51 in the path of the light reflected by the second light divider, and a green filter 52 in the path of the light reflected by the reflector. In this case the light falling on the film from the first light divider will be predominantly of the violet values of the subject, while the light falling on the film from the second light divider will be predominantly of the orange values of the subject, and the light falling on the film from the reflector 19 will be predominantly of the green values of the subject.

Having described only a typical preferred form of my invention I do not wish to limit myself to the specific details set forth, but wish to reserve to myself any changes or variations that may appear to those skilled in the art or fall within the scope of the following claims.

Having described my invention I claim:

1. An optical system for making simultaneously a plurality of like pictures of a single subject on separate areas of a film including a single lens, and a plurality of reflectors between the lens and subject and arranged one behind the other in the path of a single shaft of light from the subject and at different angles in said single shaft of light from the subject to reflect off converging shafts through the lens onto the film.

2. An optical system for making simultaneously a plurality of like pictures of a single subject on separate areas of a film including a single lens, and a plurality of reflectors between the lens and subject and arranged one behind the other in the path of a single shaft of light from the subject and at different angles in the shaft of light from the subject to reflect off converging shafts which intersect at a single point and pass through the lens onto the film.

3. An optical system for making simultaneously a plurality of like pictures of a single subject on separate areas of a film including a single lens, a plurality of reflectors arranged between the lens and subject and one spaced behind the other in the path of a single shaft of light from the subject and at different angles in the shaft of light from the subject to reflect off converging shafts through the lens onto the film, and bodies of transparent material arranged in the path of some of the reflected shafts of light to refract the light so that the reflected shafts are of equal size at the film.

In witness that I claim the foregoing I have hereunto subscribed my name this 4th day of October, 1926.

WALTER L. WRIGHT.